(12) United States Patent
de Hoog et al.

(10) Patent No.: US 10,608,436 B2
(45) Date of Patent: Mar. 31, 2020

(54) SYSTEM AND METHOD FOR OPTIMAL AGGREGATION OF SMALL-SCALE ENERGY STORAGE

(71) Applicant: International Business Machines Corporation, Armonk, NY (US)

(72) Inventors: Julian de Hoog, Greensborough (AU); Arun Vishwanath, Blackburn (AU); Timothy M. Lynar, Melbourne (AU); Adam Eberbach, Surrey Hills (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/834,412

(22) Filed: Dec. 7, 2017

(65) Prior Publication Data
US 2019/0181641 A1 Jun. 13, 2019

(51) Int. Cl.
H02J 3/32 (2006.01)
G05B 13/04 (2006.01)
H02J 3/00 (2006.01)
H02J 13/00 (2006.01)

(52) U.S. Cl.
CPC .............. *H02J 3/32* (2013.01); *G05B 13/048* (2013.01); *H02J 13/0079* (2013.01); *H02J 2003/003* (2013.01); *H02J 2003/007* (2013.01)

(58) Field of Classification Search
CPC .. H02J 3/32; H02J 2003/007; H02J 2003/003; G05B 13/048
USPC ........................................................ 700/295
See application file for complete search history.

(56) References Cited

U.S. PATENT DOCUMENTS

| 6,710,588 | B1 | 3/2004 | Verfuerth et al. |
| 6,724,180 | B1 | 4/2004 | Verfuerth et al. |
| 7,778,940 | B2 | 8/2010 | Mazzarella |
| 9,026,347 | B2 | 5/2015 | Gadh et al. |
| 9,705,333 | B2 | 7/2017 | Clifton |
| 2007/0040263 | A1 | 2/2007 | Towada |

(Continued)

FOREIGN PATENT DOCUMENTS

GB 2455421 A 6/2009

OTHER PUBLICATIONS

S. Shinzaki et al., "Deployment of Vehicle-to-Grid Technology and Related Issues," SAE Technical Paper 2015-01-0306, Apr. 14, 2015, 7 pages.

*Primary Examiner* — Thomas C Lee
*Assistant Examiner* — Anzuman Sharmin
(74) *Attorney, Agent, or Firm* — Joseph Petrokaitis; Ryan, Mason & Lewis, LLP

(57) ABSTRACT

A system for optimal aggregation of small-scale energy storage capacity includes a processor operatively coupled to memory. The processor is configured to implement the steps of: generating predicted energy consumption data based on a model of expected energy usage within a given electrical network; generating predicted energy generation data based on a model of expected energy generation for the given electrical network; generating dispatchable energy storage capacity for one or more energy storing devices having a small-scale energy storage capacity for the given electrical network; determining a set of energy storage devices that need to be dispatched for the given electrical network; comparing the predicted energy consumption data with the predicted energy generation data; and dispatching the set of energy storage devices for the given electrical network.

20 Claims, 5 Drawing Sheets

(56) References Cited

U.S. PATENT DOCUMENTS

| | | |
|---|---|---|
| 2007/0282495 A1 | 12/2007 | Kempton et al. |
| 2010/0017249 A1 | 1/2010 | Fincham et al. |
| 2012/0059527 A1 | 3/2012 | Beaston et al. |
| 2012/0249057 A1* | 10/2012 | Abe ................. H02J 7/041 |
| | | 320/107 |
| 2014/0070756 A1 | 3/2014 | Kearns et al. |
| 2015/0008864 A2 | 1/2015 | Wolter |
| 2016/0011617 A1* | 1/2016 | Liu ................. G05B 15/02 |
| | | 700/287 |
| 2016/0062380 A1* | 3/2016 | Schwarz ............ G05F 1/66 |
| | | 700/295 |
| 2016/0347195 A1 | 12/2016 | Bridges et al. |
| 2016/0364646 A1 | 12/2016 | Fischer |
| 2017/0005474 A1 | 1/2017 | Sanders et al. |
| 2017/0070084 A1* | 3/2017 | Matsumoto ............ H02J 3/32 |
| 2017/0222437 A1 | 8/2017 | Pratt et al. |
| 2017/0256952 A1* | 9/2017 | Sugahara ............ H02S 40/38 |

\* cited by examiner

200

SYSTEM AND METHOD FOR OPTIMAL AGGREGATION OF SMALL-SCALE ENERGY STORAGE

BACKGROUND

This disclosure generally relates to a system and method for optimal aggregation of small-scale energy storage.

Electrical networks (i.e., a grid) deliver electricity from where it is generated to where it is consumed. Components (such as transformers and cables) throughout the grid are typically designed and sized to be able to handle "peak load"—the maximum load that may occur in that part of the network at any time of the year. If peak load for a given component exceeds its rated capacity, it may fail (leading to blackouts) and it may need to be replaced. Two key aspects to ensuring a reliable and well-functioning electrical network are that (1) supply and demand must at all times be matched, and (2) the rated capacity of many components throughout the network must not be exceeded.

In existing electrical networks, supply and demand must therefore always be kept in a careful balance. For example, as more electricity is required in the evening when one arrives home and turns on, for example, the lights, tv, oven, heating, etc., an equivalent amount of electricity generation must be dispatched to supply this demand. The utility company (or market operator) must therefore constantly forecast demand and ensure that there is enough generation to meet it.

With the increasing introduction of renewable generation (e.g., solar or wind energy) into the electrical networks, this equation is changing. While in the past, the challenge was always to match supply to demand (and only demand needed to be forecast), now there is also a lot of uncertainty around supply, Unlike fossil fuel based power plants, renewables are uncontrollable and unpredictable, and produce more energy when the sun is shining or the wind is blowing. In some places in the world, this can mean that at times there can be an oversupply, i.e., more energy generation than demand. Accordingly, in many places in the world today, the challenge is not just to match supply to demand, but also to match demand to supply. Thus, there is a need to also forecast the supply of energy.

One way to ease these problems is energy storage. For example, batteries (or other energy storage solutions) can charge when there is too much supply, and discharge when there is too much demand, to constantly assist in maintaining a steady supply-demand balance. However, in many scenarios dedicated energy storage can be very costly to install and maintain.

Accordingly, it is desirable to harness existing energy storage to help better manage our electrical networks by both (i) ensuring a healthy supply-demand balance, and (ii) protecting vulnerable components of the electrical network against peak load events.

SUMMARY

Illustrative embodiments of the invention provide techniques for optimal aggregation of small-scale energy storage. While illustrative embodiments are well-suited to harness existing energy storage to help better manage electrical networks, alternative embodiments may be implemented.

For example, one exemplary embodiment includes a method for optimal aggregation of small-scale energy storage capacity comprising:

generating predicted energy consumption data based on a model of expected energy usage within a given electrical network;

generating predicted energy generation data based on a model of expected energy generation for the given electrical network;

generating dispatchable energy storage capacity for one or more energy storing devices having a small-scale energy storage capacity for the given electrical network;

determining a set of energy storage devices that need to be dispatched for the given electrical network;

comparing the predicted energy consumption data with the predicted energy generation data; and dispatching the set of energy storage devices for the given electrical network, wherein the steps of the method are performed in accordance with a processor and a memory.

Another exemplary embodiment includes a system for optimal aggregation of small-scale energy storage which comprises: a memory and a processor. The processor is operatively coupled to the memory and configured to implement the steps of:

generating predicted energy consumption data based on a model of expected energy usage within a given electrical network;

generating predicted energy generation data based on a model of expected energy generation for the given electrical network;

generating dispatchable energy storage capacity data for one or more energy storing devices having a small-scale energy storage capacity for the given electrical network;

determining a set of energy storage devices that need to be dispatched for the given electrical network;

comparing the predicted energy consumption data with the predicted energy generation data; and dispatching the set of energy storage devices for the given electrical network.

Another exemplary embodiment includes an article of manufacture to provide optimal aggregation of small-scale energy storage capacity which comprises a computer-readable storage medium for storing computer-readable program code which, when executed, causes a computer to:

generate predicted energy consumption data based on a model of expected energy usage within a given electrical network;

generate predicted energy generation data based on a model of expected energy generation for the given electrical network;

generate dispatchable energy storage capacity for one or more energy storing devices having a small-scale energy storage capacity for the given electrical network;

determine the set of energy storage devices that need to be dispatched;

compare the predicted energy consumption data with the predicted energy generation data; and dispatch the set of energy storage devices for the given electrical network.

These and other features, objects and advantages of the present invention will become apparent from the following detailed description of illustrative embodiments thereof, which is to be read in connection with the accompanying drawings.

DETAILED DESCRIPTION

Embodiments of the present invention will now be described in further detail with regard to systems and methods for optimal aggregation of small-scale energy storage. Features of the embodiments of the present invention allow the systems and methods to optimally match charging and discharging patterns of energy storing devices to the given electrical network requirements. The term "energy storing devices" as used herein refers to any device having an energy storage capacity, such as, for example, mobile phones, tablets, laptop computers, desktop computers, electric vehicles of any sort (e.g., bikes, scooters, cars, etc.), home appliances that may have a battery (e.g., TVs, fridges, dishwashers, washing machines, dryers, alarm clocks, etc.) and any other dedicated home energy storage systems.

Features of the embodiments of the present invention also allow the systems and methods to optimally schedule the charging and discharging of small-scale energy storage capacity for one or more energy storing devices in response to forecasts of expected energy demand and expected energy generation based on relevant information, including, for example, local household characteristics, local time-series data, local network constraints, and anticipated network load, which in turn can be influenced by, for example, weather forecasts. The present invention also takes into account the potential impact of charging/discharging on the lifetime of the small-scale energy storage capacity of the electronic storage devices, including, for example, consideration of the fact that different battery chemistries may be affected by discharging schedules in different ways. Accordingly, features of the embodiments of the present invention allow for the harnessing the power of hundreds, thousands, or millions of such devices having much smaller capacities and requiring more fine grained interaction and control than, for example, a virtual power plant which relies on energy storage devices that are made specifically for charging/discharging interaction with a grid. Thus, embodiments of the present invention can monitor and forecast local expected energy demand.

Figure 1:
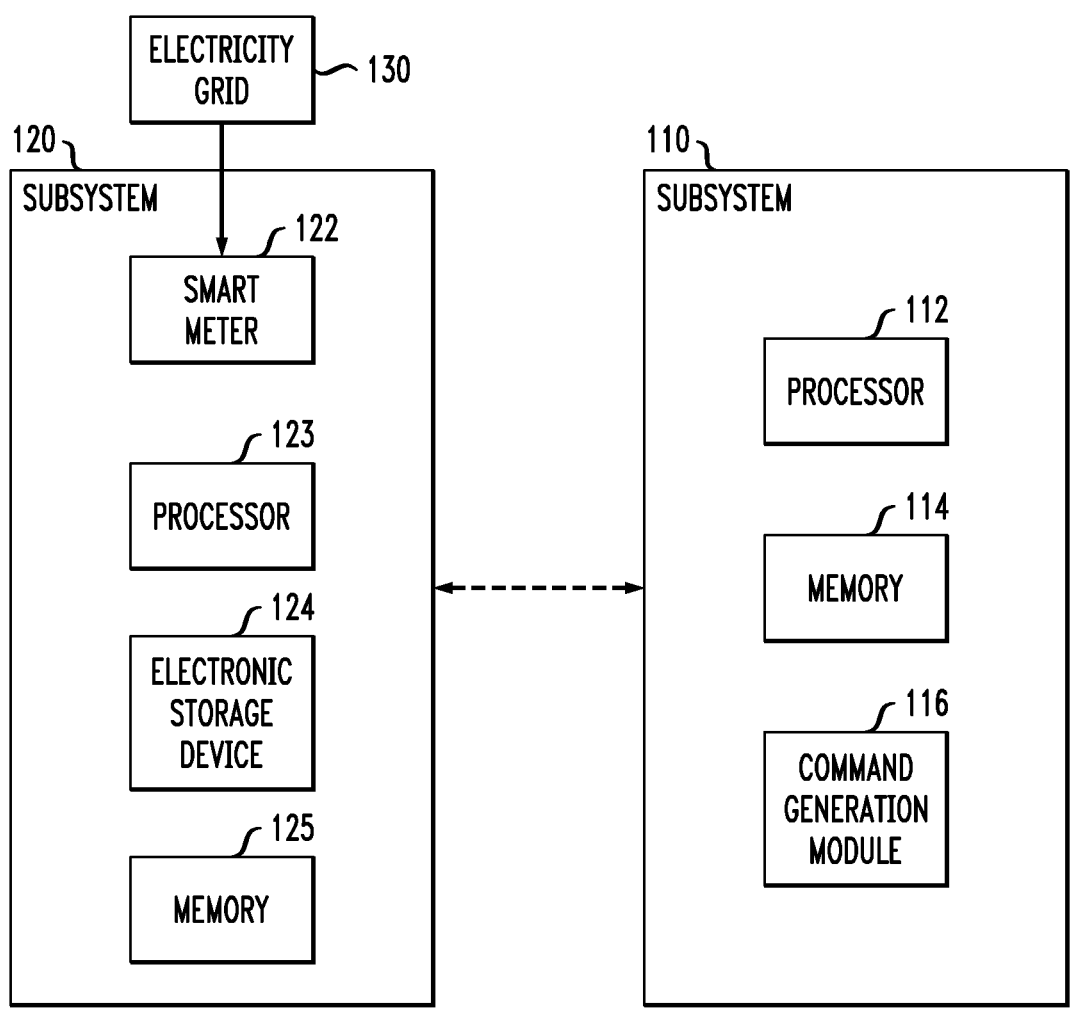
FIG. 1 depicts a block diagram illustrating an overview of a system, according to an embodiment of the invention.

The system of FIG. 1 is configured for optimal aggregation of small-scale energy storage, in real-time or near real-time, by scheduling charging or discharging of small-scale energy storage capacity of a given set of energy storing devices in response to predicted energy consumption and generation. System 100 may be interpreted as being comprised of two "subsystems," including subsystem 110 and subsystem 120. Although subsystems 110 and 120 are depicted in FIG. 1 as being individual subsystems of system 100, this depiction is purely exemplary for the ease in description. For example, subsystems 110 and 120 may alternatively be embodied within a single combination, or as a combination of sub-combinations of subsystems.

In one embodiment, subsystem 110 will be the controlling entity. For example, a controlling entity will need to exist that monitors the state of charge of the energy storing devices, as well as the prediction of energy consumption and energy generation for the given electrical network, and then dispatches charging or discharging commands to the electronic storage devices. The controlling entity can be, for example, the utility, i.e., the electrical network operator, that manages the given electrical network, or an energy market operator, e.g., an entity that ensures supply and demand are balanced (and schedules generation), or any third party that has an economic incentive to ensure the given electrical network is well maintained and runs smoothly. In one embodiment, subsystem 110 comprises a computer system or server. For example, as shown, subsystem 110 may comprise processor 112, memory 114, and command generation module 116. Command generation module 116 operates to generate a communication for delivery to the one or more energy storage devices informing them that the energy storage device can be discharged, as discussed below, based on data obtained from subsystem 120.

In one embodiment, subsystem 120 comprises components within a system of a building, such as a dwelling. For example, subsystem 120 may comprise one or more Network of Things (NoT) components, or primitives. In one embodiment, the NoT is an Internet of Things (IoT). IoT is an instantiation of a NoT in which the components of the NoT are tethered to the Internet. The one or more NoT components may comprise one or more sensors, one or more aggregators, one or more communication channels, one or more external utilities (eUtilities) and at least one decision trigger. Generally speaking, a sensor may be defined as an electronic utility that measures one or more physical properties. An aggregator may be defined as a software implementation based on one or more mathematical functions that transform raw data into aggregated data. A communication channel may be defined as a medium by which data is transmitted (e.g., physical via Universal Serial Bus (USB), wireless, wireless, wired, verbal, etc.). An eUtility may be defined as a software or hardware product or service that executes processes or feed data into the overall workflow of a NoT (e.g., database, mobile device, software or hardware system, cloud, computer, CPU, etc.). A decision trigger may be defined as a conditional expression that triggers an action needed to satisfy the purpose, specification and requirements of the NoT.

As shown in the illustrative embodiment of FIG. 1, subsystem 120 comprises components including smart meter 122, electronic storage device 124, at least one processor 123 and memory 125. The arrangement of the components of subsystem 120 depicted in FIG. 1 is not to be considered limiting.

Electronic storage device 124 can be any of those discussed above. In one embodiment, electronic storage device 124 has Internet access capability. The electronic storage devices 124 are configured with subsystem 120 in order to participate in the process. For example, an app can be installed on the electronic storage device to allow the user to sign up with the controlling entity and register as a participant. For example, the electronic storage device can automatically be signed up as a participant by its original equipment manufacturer. For example, the electronic storage device can be registered by its owner as a participant using its unique identifier, such as a MAC address. Without loss of generality, there may be many other ways for the electronic storage device to be included as a participant. In one embodiment, the participant can periodically register its status and availability. Accordingly, the controlling entity will then communicate a charge/discharge command to the electronic device and the participant can choose to accept or decline to participate at that time.

Smart meter 122 is shown in communication with electrical grid 130. A smart meter is an electronic device that can record energy consumption data and communicates the energy consumption data back to a utility or command generation module 116. For example, a smart meter may be configured to record the energy consumption data in scheduled intervals (e.g., every minute or every hour). The temporal scale by which the smart meter is configured to record the energy consumption data should be sufficiently fine for implementation in accordance with the embodiments described herein. A smart meter may include one or more real-time or near real-time sensors, and may provide power outage notification, power quality monitoring, and two-way communication with the utility. Accordingly, a smart meter may be configured to support real-time or near real-time energy monitoring functionality.

Energy consumption data obtained from meter 122 may be correlated with additional data using a "learning" model. Further details regarding the creation of the models are described herein with reference to FIG. 2.

System 100 may be configured to support hundreds, thousands, or even millions of such electronic storage devices in a given electrical network. In one embodiment, smart meter 122 and electronic storage device 124 send their data directly to subsystem 110. In an alternative embodiment, subsystem 110 is configured to aggregate or compile data from smart meter 122 and electronic storage device 124 and send the aggregated data to subsystem 120.

Figure 2:
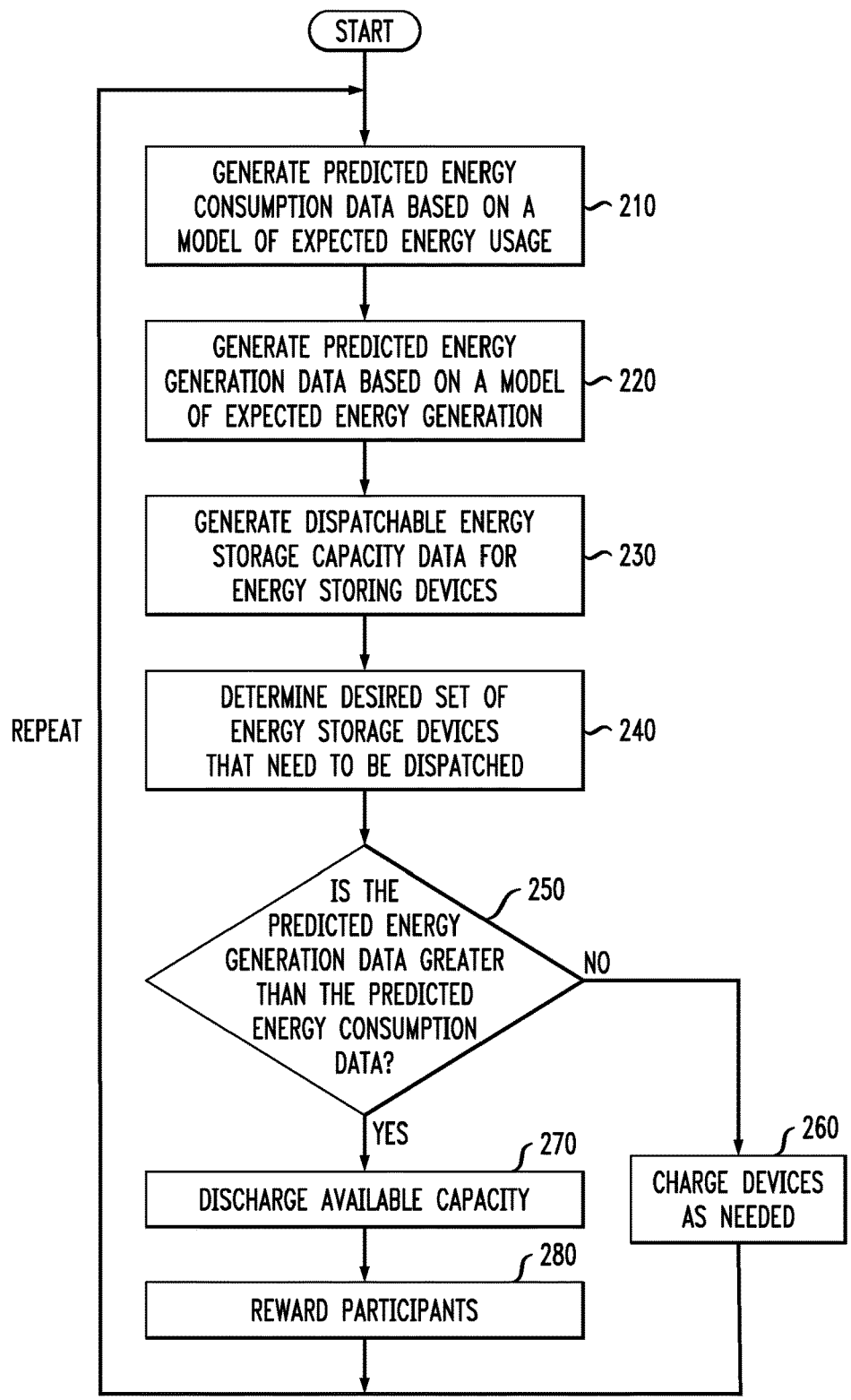
FIG. 2 shows a flow diagram illustrating a method for optimal aggregation of small-scale energy storage, according to an embodiment of the invention.

With reference to FIG. 2, flow diagram 200 is provided illustrating a process for optimal aggregation of small-scale energy storage. At step 210, predicted energy consumption data is generated based on a model of expected energy usage for a given electrical network. In one embodiment, the model of expected energy usage is a function of one or more variables. For example, the model of expected energy usage for a given electrical network can be based on a set of historical electricity usage data, a set of socio-economic data, a set of demographic data and a set of historical weather data. It is to be understood and appreciated that the set of historical electricity usage data, set of socio-economic data, set of demographic data and set of historical weather data are not to be considered limiting.

The set of historical electricity usage data may be obtained from a smart meter. For example, the set of historical electricity usage data may comprise a historical electricity usage data obtained from a smart meter for an individual. Additionally, the set of historical electricity usage data may further comprise historical electricity usage data obtained from a smart meter for like individuals. The set of demographic data may include data relating to the demographic of individuals living in a dwelling. For example, the model of expected electricity usage may be specific to a single demographic dwelling, or a multiple demographic dwelling or multiple demographic dwellings. The model of expected electricity usage may be adjusted to account for typical use, which may be affected by the energy efficiency of the lifestyle of the occupants, electrical equipment of the dwelling, etc. Accordingly, the model of expected electricity usage may be based on an understanding of the network, i.e., the number and size of houses, historical data for the network, usage based on time of day, day of week, and/or week of year, weather forecast, and an understanding of special days, e.g. holidays. The model may also be based on any additional information of relevance. For example, in a given network that contains electric vehicles, traffic data may be relevant to determine when people will arrive at home and plug in their electric vehicles. In one embodiment, creating the model of expected electricity usage comprises using a statistical modeling process. For example, the model may be created via a machine learning process, a Gaussian process, etc.

At step 220, predicted energy generation data is generated based on a model of expected energy generation for a given electrical network. In one embodiment, the model of expected energy generation is a function of one or more variables. In one embodiment, the model of expected energy generation can be based on an understanding of the electrical network. For example, the model can be based on a number and size of distributed generation stations, e.g., electrical generation stations in a given network, or the number of solar panels on a dwelling's roof. In one embodiment, the model may be based on a set of historical electricity generation data in a given network such as the historical electricity generation data for a given time of day, day of week, and/or week of year. In one embodiment, the model can be based on a weather forecast, e.g., cloud coverage, snow, or rain which may cover solar panels or wind speed for wind energy. In one embodiment, the model can be based on satellite or radar data (e.g. for solar or wind generation), or sky-facing cameras (for solar generation). The model may also be based on any additional information of relevance. For example, in a given network which contains trees, these may shade panels more in summer than in winter. In one embodiment, creating the model of expected electricity generation comprises using a statistical modeling process. For example, the model may be created via a machine learning process, a Gaussian process, etc.

At step 230, dispatchable energy storage capacity data will be generated. As discussed above, each energy storing device has an energy storage capacity. Thus, to find the desired set of energy storage devices, as discussed below, the energy storage capacity of each energy storage device has to be determined. For example, dispatchable energy storage can be calculated as follows:

1. Periodically, each participating energy storage device communicates its state of charge (SOC) and willingness to participate (binary decision, 1 or 0) to the controlling entity.
2. In one embodiment, the controlling entity calculates a unique score for every participating energy storage device in the given electrical network. For example, a unique score could be calculated from the following equation I:

$$S_i = D_i^{cap} \times \left(1 - \frac{|D_i^{SOC} - 50|}{50}\right) \quad (I)$$

where $S_i$ is the score for device i, $D_i^{cap}$ is the rated charge/discharge capacity of device i, and $D_i^{SOC}$ is the current state of charge of device i.

Thus, for example, dispatchable energy storage capacity data can be generated as follows using equation I:

a 100 Watt-hour (Wh) battery at 100% state of charge would have a score of 0;

a 100 Wh battery at 75% state of charge would have a score of 50;

a 100 Wh battery at 50% state of charge would have a score of 100 a 100 Wh battery at 25% state of charge would have a score of 50;

a 100 Wh battery at 0% state of charge would have a score of 0;

a 50 Wh battery at 50% state of charge would have a score of 50; and a 200 Wh battery at 50% state of charge would have a score of 200.

In other words, higher capacity batteries, and batteries closer to 50% state of charge are prioritized. This will assist in protecting the lifetime of the battery which, for many types of batteries such as Li-ion batteries, typically age faster if they are closer to 0% or 100% state of charge. It should be understood that there are other ways to calculate a unique score within the purview of one skilled in the art, e.g., different types of batteries could be scored in different ways.

At step 240, the desired set of energy storage devices that need to be dispatched is then determined, i.e., whether the desired set of energy storage devices can be charged or discharged, in order to either maintain necessary supply-demand balance in the given electrical network, or avoid any component in the given electrical network exceeding their rated capacity. Based on the unique score, the desired set of energy storage devices that needs to be dispatched is determined. For example, the determination of the desired set of energy storage devices that need to be dispatched can be done as follows:

1. Based on the ranked list determined above for each unique score, each energy storage device can be added to a list of dispatched devices ("Dispatch List"), starting from the highest score, one at a time.
2. Following the addition of each device to the Dispatch List, the controlling entity determines whether supply-demand balance in the given electrical network is met, and whether all components in the given network are operating below their rated capacity.
3. If yes, the Dispatch List is finalized. If no, the next energy storage device in the list is added to the Dispatch List.
4. Once the Dispatch List is confirmed, all energy storage devices in the list receive control commands indicating to charge or discharge.

In some embodiments explicit confirmation indicators or messages may be sent to or presented by the energy storage device to inform the owner that the energy storage device can be dispatched. The owner will then have the option to accept or decline the option for the energy storage devices to be dispatched. The confirming messages or indicators may be textual messages. In other embodiments, the confirming indicators may be other types such as audio indicators.

At step 250, a comparison between the predicted energy consumption data and the predicted energy generation data is performed by calculating a difference between the predicted energy consumption data and the predicted energy generation data. For example, the result of comparison step 250 may be no when the predicted energy consumption data is greater than the predicted energy generation data. Accordingly, at step 260, based on the comparison, the set of energy storage devices can be charged. Alternatively, the result of comparison step 250 may be yes when the predicted energy generation data is greater than the predicted energy consumption data. Accordingly, at step 270, based on the comparison, the set of energy storage devices can be discharged to balance the supply-demand in the given electrical network. If desired, when the result of comparison step 250 is yes, a corresponding reward step 280 can be sent to the owner of the energy storage device for participating in the program. For example, the reward may be in the form of a credit on the owner's next electricity bill. For example, the reward may be in the form of points to the owner for discounts. For example, the reward may be in the form of a direct monetary deposit into the owner's chosen account. Without loss of generality, many additional forms of reward are possible.

In order for the supply-demand to remain balanced in the given electrical network, the process loops back and again performs steps 210 through 270. Thus, the processing in steps 210 through 270 may be considered as being performed continuously.

Figure 3:
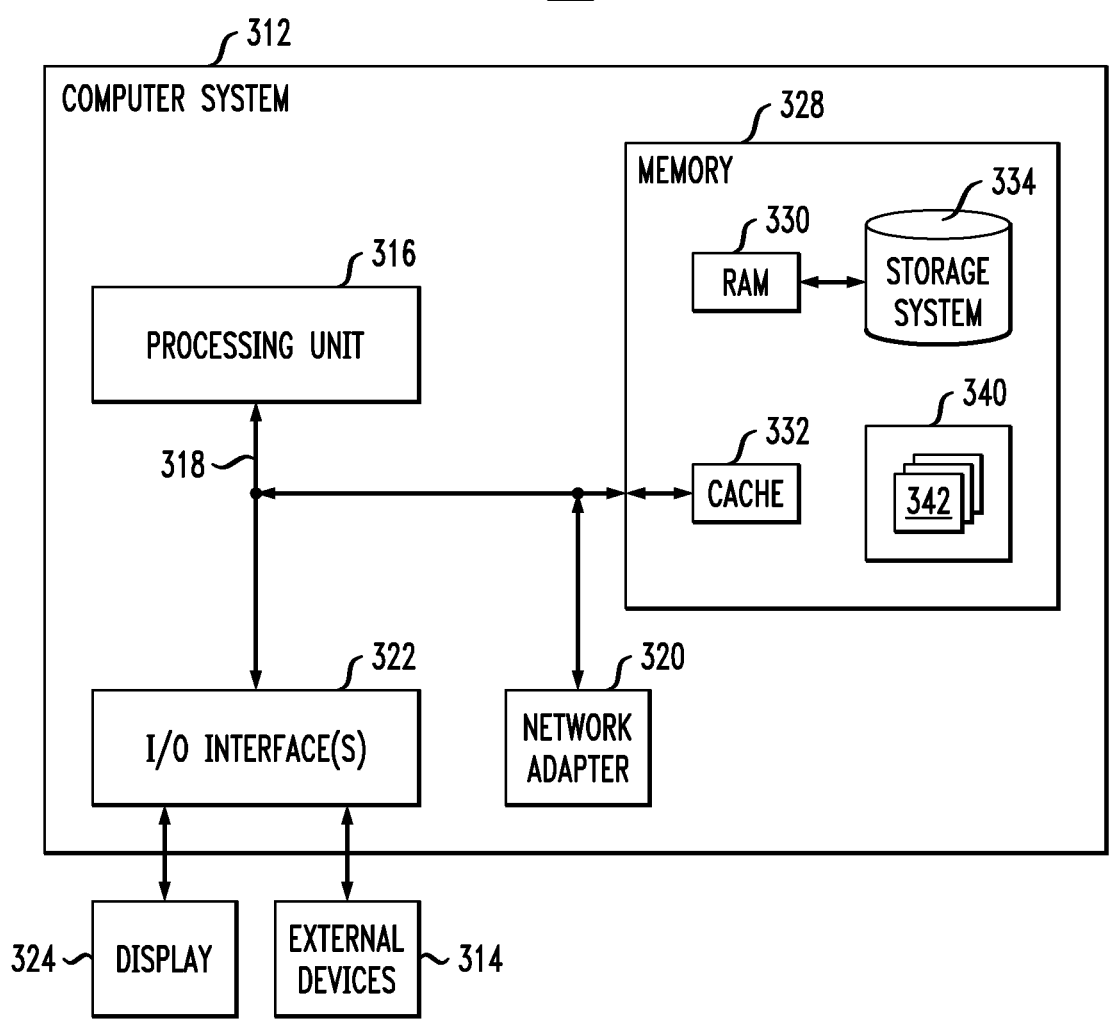
FIG. 3 depicts a computer system in accordance with which one or more components/steps of techniques of the invention which may be implemented according to an embodiment of the invention.

One or more embodiments can make use of software running on a computer or workstation. With reference to FIG. 3, in a computing node 310 there is a system/server 312, which is operational with numerous other general purpose or special purpose computing system environments or configurations. Examples of well-known computing systems, environments, and/or configurations that may be suitable for use with system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

System/server 312 may be described in the general context of computer system executable instructions, such as program modules, being executed by a computer system. Generally, program modules may include routines, programs, objects, components, logic, data structures, and so on that perform particular tasks or implement particular abstract data types. System/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, system/server 312 is shown in the form of a computing device. The components of system/server 312 may include, but are not limited to, one or more processors or processing units 316, system memory 328, and bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 312 typically includes a variety of computer system readable media. Such media may be any available media that is accessible by system/server 312, and it includes both volatile and non-volatile media, removable and non-removable media.

The system memory 328 can include computer system readable media in the form of volatile memory, such as random access memory (RAM) 330 and/or cache memory 332. System/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces.

As depicted and described herein, memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

System/server 312 may also communicate with one or more external devices 314 such as a keyboard, a pointing device, an external data storage device (e.g., a USB drive), display 324, one or more devices that enable a user to interact with system/server 312, and/or any devices (e.g., network card, modem, etc.) that enable system/server 312 to communicate with one or more other computing devices. Such communication can occur via I/O interfaces 322. Still yet, system/server 312 can communicate with one or more networks such as a LAN, a general WAN, and/or a public network (e.g., the Internet) via network adapter 320. As depicted, network adapter 320 communicates with the other components of system/server 312 via bus 318. It should be understood that although not shown, other hardware and/or software components could be used in conjunction with system/server 312. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
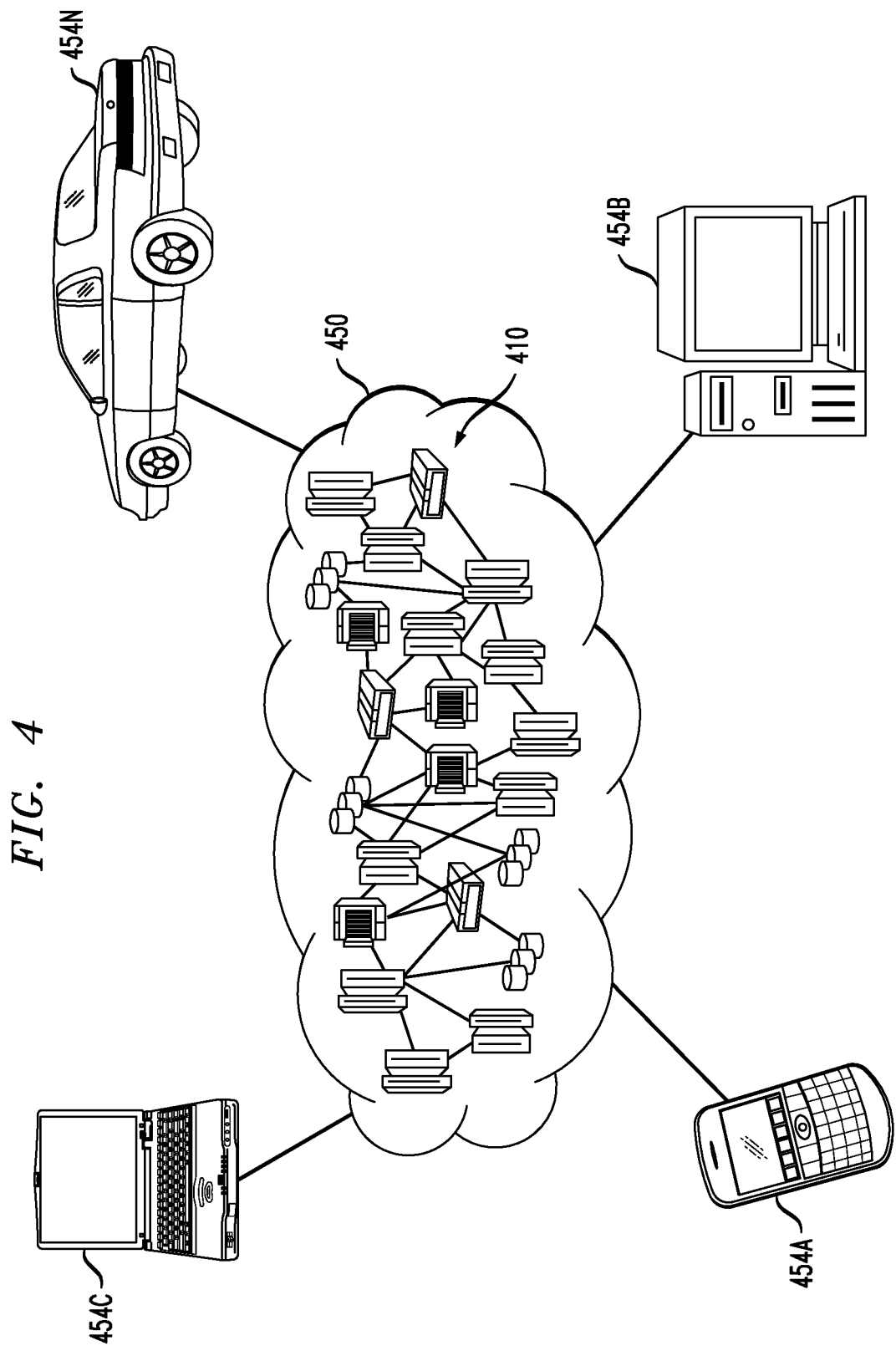
FIG. 4 depicts a cloud computing environment according to an embodiment of the invention.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
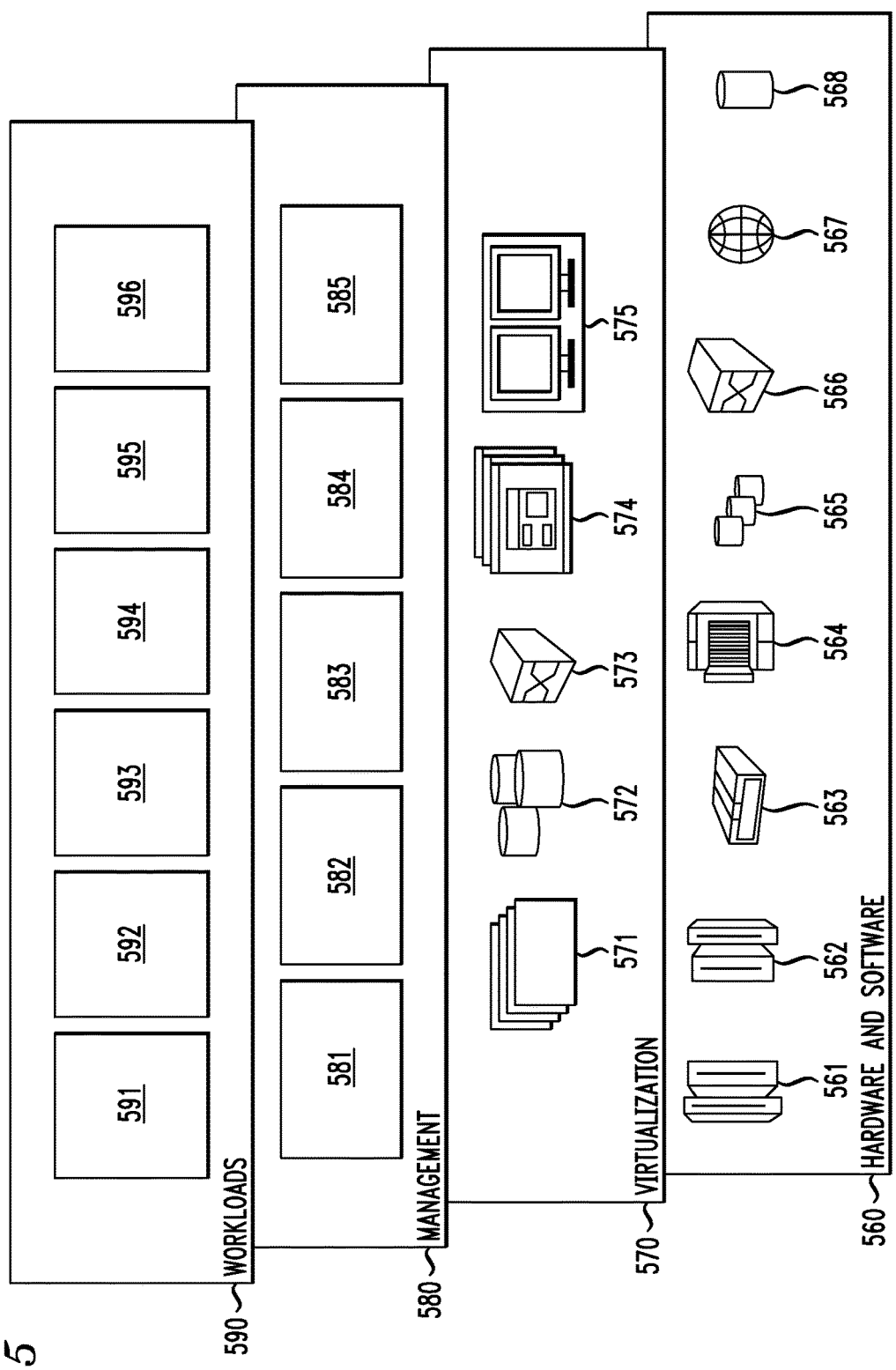
FIG. 5 depicts abstraction model layers according to an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 474; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: transaction data capture 591; blockchain computation 592; data analytics processing 593; risk assessment 594; alert processing 595; and ameliorative/corrective/remedial action implementation 596, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The flowchart diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams, and combinations of blocks in the diagrams, can be implemented by special purpose hardware-based systems that perform the specified functions or acts or carry out combinations of special purpose hardware and computer instructions.

Although illustrative embodiments have been described herein with reference to the accompanying drawings, it is to be understood that the invention is not limited to those precise embodiments, and that various other changes and modifications may be made by one skilled in art without departing from the scope or spirit of the invention.

What is claimed is:

1. A method for aggregation of small-scale energy storage capacity comprising:
    generating predicted energy consumption data based on a model of expected energy usage within a given electrical network;
    generating predicted energy generation data based on a model of expected energy generation for the given electrical network;
    generating dispatchable energy storage capacity for one or more energy storing devices having a small-scale energy storage capacity for the given electrical network;
    determining a set of energy storage devices that need to be dispatched for the given electrical network;
    in response to a user of the energy storage device accepting or rejecting a request to be dispatched, comparing the predicted energy consumption data with the predicted energy generation data; and
    dispatching the accepted set of energy storage devices for the given electrical network,
    wherein the steps of the method are performed in accordance with a processor and a memory.

2. The method of claim 1, further comprising creating the model for expected energy usage based on one or more sets of data.

3. The method of claim 2, wherein the model for expected energy usage is created as a function of one or more variables.

4. The method of claim 2, wherein the one or more sets of data comprise one or more of a set of historical electricity usage data, a set of demographic data, a set of traffic data and a set of weather data.

5. The method of claim 1, further comprising creating the model for expected energy generation based on one or more sets of data.

6. The method of claim 5, wherein the model for expected energy generation is created as a function of one or more variables.

7. The method of claim 5, wherein the one or more sets of data comprise one or more of a set of historical electricity generation data, a set of demographic data, a set of historical traffic data, a set of satellite or radar data and a set of historical weather data.

8. The method of claim 1, wherein the step of comparing comprises calculating a difference between the predicted energy consumption data and the predicted energy generation data.

9. The method of claim 8, wherein when the predicted energy generation data is greater than the predicted energy consumption data, the step of dispatching the set of energy storage devices comprises discharging the set of energy storage devices.

10. The method of claim 8, wherein when the predicted energy generation data is less than the predicted energy consumption data, the step of dispatching the set of energy storage devices comprises charging the set of energy storage devices.

11. The method of claim 8, wherein when the predicted energy generation data is greater than the predicted energy consumption data, the method further comprises rewarding a user of the energy storage device.

12. The method of claim 1, wherein the step of generating dispatchable energy storage capacity for one or more energy storing devices having a small-scale energy storage capacity for the given electrical network comprises generating a score for each energy storing device.

13. The method of claim 12, wherein the step of determining a set of energy storage devices that need to be dispatched for the given electrical network comprises ranking each energy storing device based on the score.

14. A system comprising:
a memory and a processor operatively coupled to the memory and configured to implement the steps of:
generating predicted energy consumption data based on a model of expected energy usage within a given electrical network;
generating predicted energy generation data based on a model of expected energy generation for the given electrical network;
generating dispatchable energy storage capacity for one or more energy storing devices having a small-scale energy storage capacity for the given electrical network;
determining a set of energy storage devices that need to be dispatched for the given electrical network;
in response to a user of the energy storage device accepting or rejecting a request to be dispatched, comparing the predicted energy consumption data with the predicted energy generation data; and
dispatching the accepted set of energy storage devices for the given electrical network.

15. The system of claim 14, further comprising creating the model for expected energy usage based on one or more sets of data comprising one or more of a set of historical electricity usage data, a set of demographic data, a set of traffic data and a set of weather data.

16. The system of claim 14, further comprising creating the model for expected energy generation based on one or more sets of data comprising one or more of a set of historical electricity generation data, a set of demographic data, a set of historical traffic data, a set of satellite or radar data and a set of historical weather data.

17. The system of claim 14, wherein the step of generating dispatchable energy storage capacity for one or more energy storing devices having a small-scale energy storage capacity for the given electrical network comprises generating a score for each energy storing device.

18. The system of claim 17, wherein the step of determining a set of energy storage devices that need to be dispatched for the given electrical network comprises ranking each energy storing device based on the score.

19. The system of claim 17, wherein the step of comparing comprises calculating a difference between the predicted energy consumption data and the predicted energy generation data.

20. A computer program product comprising a non-transitory computer readable storage medium for storing computer readable program code which, when executed, causes a computer to:
generate predicted energy consumption data based on a model of expected energy usage within a given electrical network;
generate predicted energy generation data based on a model of expected energy generation for the given electrical network;
generate dispatchable energy storage capacity for one or more energy storing devices having a small-scale energy storage capacity for the given electrical network;
determine a set of energy storage devices that need to be dispatched for the given electrical network;
in response to a user of the energy storage device accepting or rejecting a request to be dispatched, compare the predicted energy consumption data with the predicted energy generation data; and
dispatch the set of energy storage devices for the given electrical network.

* * * * *